United States Patent [19]

Soo

[11] Patent Number: 5,244,486
[45] Date of Patent: Sep. 14, 1993

[54] FLUORESCENT TUBE COILING APPARATUS

[75] Inventor: Sung D. Soo, Inchon, Rep. of Korea

[73] Assignee: Shin Kwang Enterprise, Co., Ltd., Rep. of Korea

[21] Appl. No.: 865,196

[22] Filed: Apr. 8, 1992

[51] Int. Cl.[5] ............... C03B 23/043; C03B 23/06
[52] U.S. Cl. ................................. 65/274; 65/276; 65/281; 65/292; 219/389; 219/521
[58] Field of Search .................. 65/108–110, 65/269, 274, 276, 281, 292, 277; 219/389, 521

[56] References Cited

U.S. PATENT DOCUMENTS

| | | | |
|---|---|---|---|
| 1,874,012 | 8/1932 | Hotchner | 65/108 |
| 2,099,247 | 11/1937 | Whitlock | 219/389 |
| 2,239,055 | 4/1941 | Sawyer | 65/292 |
| 3,551,128 | 12/1970 | Sawyer | 65/292 |
| 4,883,529 | 11/1989 | Nishimura et al. | 65/281 |

Primary Examiner—Joye L. Woodard
Attorney, Agent, or Firm—Anthony J. Casella; Gerald E. Hespos

[57] ABSTRACT

An apparatus is provided for coiling fluorescent tubes, so that the tubes may be placed within a bulb. The apparatus includes a rotatable turntable having a plurality of ovens thereon. Each oven has a lever to enable the oven to be opened for placement of a fluorescent tube therein. A piston/cylinder assembly is mounted in proximity to the rotatable turntable and can selectively engage one of the levers for opening the corresponding oven. A ratchet assembly is provided for selectively rotating the turntable into positions where the piston/cylinder assembly in contact one of the levers and open the respective oven. A tube coiling screw is disposed in proximity to the turntable to enable coiling of a fluorescent tube thereabout after sufficient heating in one of the ovens.

6 Claims, 3 Drawing Sheets

FLUORESCENT TUBE COILING APPARATUS

BACKGROUND OF THE INVENTION

This invention relates to a fluorescent tube coiling apparatus, and more specifically, to an apparatus for bending, for example, a 20 W or 40 W fluorescent lamp having a diameter of 10 mm~17.5 mm and a length of about 40 cm, two or three times, around a screw, to make the fluorescent tube compact enough to be placed in a bulb.

Generally, the prior fluorescent lamp has a long tube shape, so that when it is installed, it occupies much space and spoils the beauty of circumference.

Recently, a coiled fluorescent lamp, called a "bulb type fluorescent lamp", which is compact like a bulb, but which has a brightness the same as the prior long fluorescent lamp has been introduced.

However, to make a bulb type fluorescent lamp requires more skilled technique, and there are many problems in manufacturing a fluorescent lamp having a long length in a coiled shape sufficient maintain the same brightness as the prior long shape tube.

SUMMARY OF THE INVENTION

Accordingly, an object of the present invention is to provide a fluorescent tube coiling apparatus which coils a fluorescent tube enough to be placed into a bulb.

In accordance with the present invention, the object of the invention is attained by providing a fluorescent coiling apparatus comprising: upper and lower turn tables(3,4) which are attached with a pipe shaft(20) as one body and rotated with a triangular plate(13) having an electric oven(14); a ratchet apparatus adapted for rotating said turn table(4); a fixed table(5) being secured on the bottom(2); transformers for regulating the inner temperature of the electric oven(14); a brush apparatus(8) having a copper plate(8A) and an insulator(8B) which are wound around said brush apparatus(8) as rows, said copper plate(8A) being contacted with the plural number of brush(10); an air cylinder(9) having a piston(9A) for opening the electric oven(14) by pushing the lever(15) attached to one side of the electric oven(14); electric ovens(14) for heating the fluorescent tubes to the predetermined temperature according to the applied voltage from said brush apparatus(8); a control box(16) for rotating said ratchet apparatus at an angle of 120 degrees and for operating the air cylinder(9) with appropriate time intervals about 8 seconds, and a tube coiling apparatus(100) for coiling the heated fluorescent tube to a rolled shape, said tube coiling apparatus having a gear assembly(102) for transmitting the rotation of motor(M), a foot board(101) for controlling the transmission of the power of motor(M), and a tube coiling part(103) having a screw(103A) for coiling a fluorescent tube into a colied shape.

Other features and advantages of the present invention will be apparent from the following description taken in conjunction with the accompanying drawings.

DESCRIPTION OF THE PREFERRED EMBODIMENT

Figure 1:
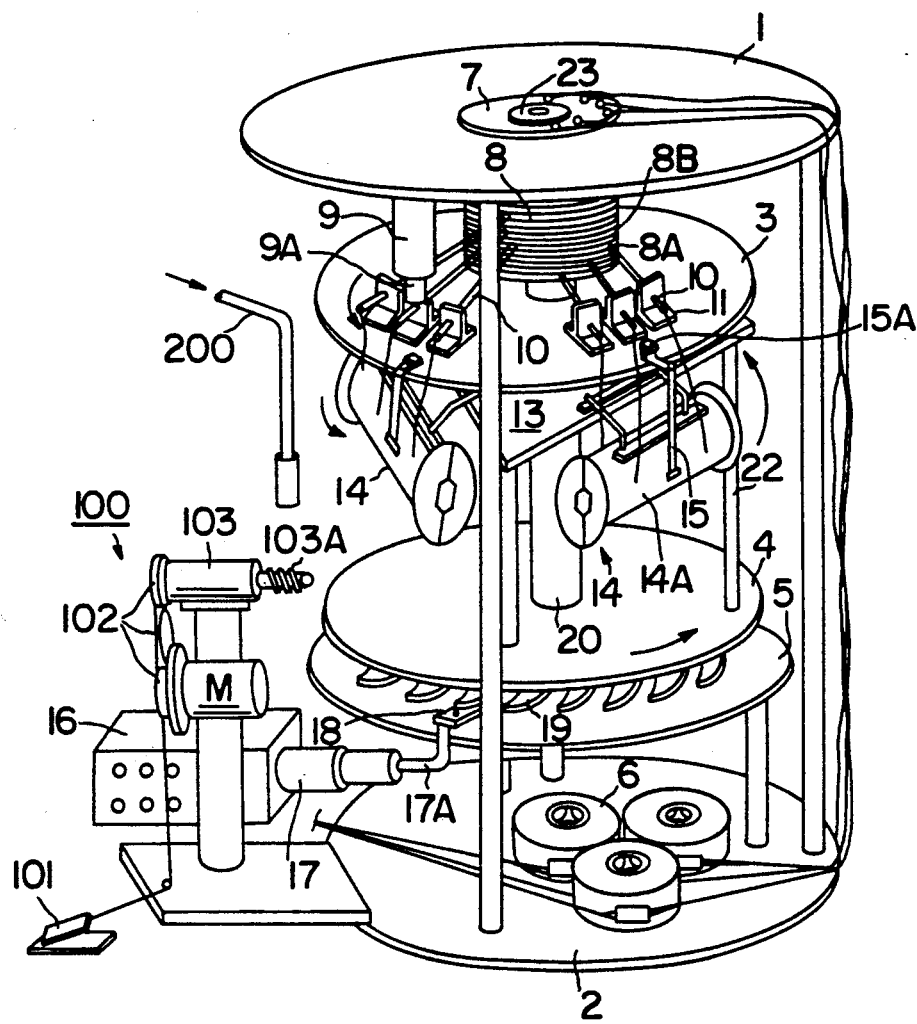
FIG. 1 is a schematic illustration of a coiling apparatus according to the present invention.

Referring to the FIG. 1, a coiling apparatus according to the present invention has two turns tables of a upper consisting turn table(3) and a lower turn table(4). Beneath the lower turn table(4) a fixed table(5) is mounted, and transformers(6) are mounted on the bottom(2). One end of each of the transformers(6) is connected to a outer power and the other end of transformers is connected to a conductor(7) which is fixed on the upper surface of the upper plate(1). The power passed through the transformer is applied to the bursh apparatus(8) which is attached to the conductor(7).

The transformers(6) operate such that the electric ovens(14) are heated to the predetermined temperature being suitable to coil a fluorescent tube.

A brush apparatus(8) has a copper plate(8A) between insulators(8B) that are wound around the outer circumference of the brush apparatus(8). Each strip of the wound copper plate(8A) is intervened between each strip of the insulator(8B).

An air cylinder(9) having a piston(9A) is fixed downstream of the upper plate(1) and is controlled by a control box(16).

At a copper plate(8A) of a brush apparatus(8) the plural number of brushes(10) (9 pieces) are contacted. As shown in FIG. 1, each brush(10) is contacted with one of the upper plate(8A) rows and each triple brush is supported by means of each supporter(11) which are attached to the upper surface of the turn table(3). The other end of the brush(10) is connected with the outer surface(14A) of the electric oven(14).

The electric ovens(14) are hung at the triangular plate(13). Three electric ovens(14) are installed with the same distance around the triangular plate(13) and have the same electric power connection with the brush apparatus(8).

The outer surface(14A) of each electric oven(14) has a lever(15) being adapted for opening the electric oven(14). Each lever(15) is generally bent and one end of the lever(15) is connected with the one side of the outer surface(14A) of a electric oven(14) and the other end of the lever(15) has a pressing part(15A).

Therefore, after the lever(15) at the electric oven(14) being rotated by the rotation of the turn table(3) and being located at the position of the air cylinder(9) attached at the upper plate(1), the piston(9A) is activated by the control of a control box(16) to press the pressing part(15A) of the lever(15) and a half of the electric oven(16) is opened.

Figure 2:
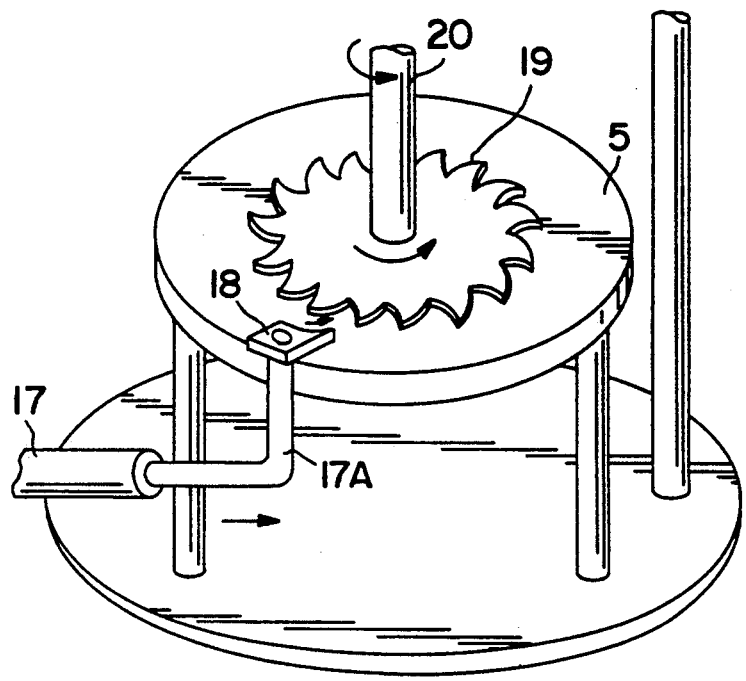
FIG. 2 is a schematic drawing of a ratchet apparatus for rotating the turn table according to the present invention.

Meanwhile, on the left side of the FIG. 1 a control box(16) is located. One end of the control box(16) is connected with an air cylinder(17). The end of the piston(17A) of the air cylinder(17) has a ratchet(18). And, on the opposite side of the ratchet(18) a ratchet wheel(19) is mounted with the pipe shaft(20) as shown in FIG. 2. Thereby, when the ratchet wheel(19) is rotated, the upper and the lower turn table(3,4), the electric oven(14) attached at the turn tables(3,4), the supporter(11), the triangular plate(13), and all of the attached parts thereof are rotated.

On the left side of the FIG. 1, tube coiling apparatus(100) is provided to make a fluorescent tube coiled. A tube coiling appartus(100) comprises a foot board(101), a gear assembly(102), and a tube coiling part(103). The end of a tube coling part(103) has a screw(103A) as shown in detail in FIG. 3.

As illustrated in FIG. 1 "M" is a motor which is controlled by the control box(16).

Figure 3:
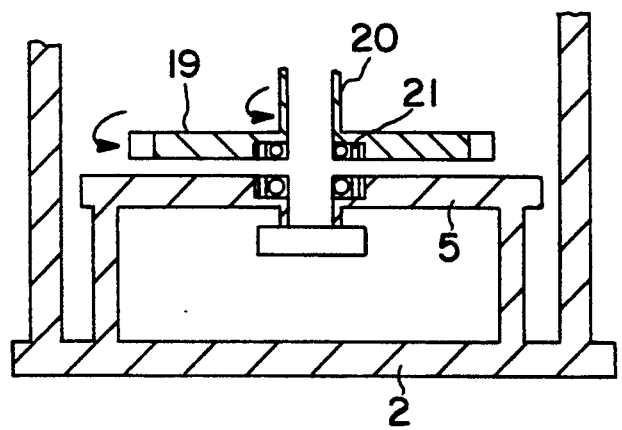
FIG. 3 is a cross-sectional view taken through the central axis of the rotating turntable depicted in FIG. 2.
Figure 4:
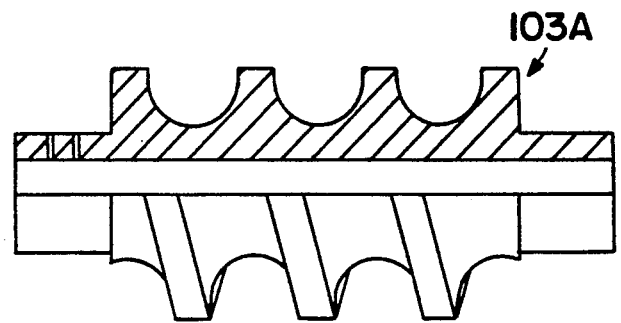
FIG. 4 is a section view of the screw part of a coiling apparatus according to the present invention.

FIG. 2 shows that a ratchet(18) connected with the end of the piston(17A) is operated with the ratchet wheel(19) by pushing operation of the piston(17A) of a air cylinder(17), and thereby the ratchet wheel(19) is rotated at angle of 120 degrees by means of a bearing(21) inserted into the center shaft of the ratchet wheel as shown in FIG. 3.

The operation of the apparatus according to the present invention will now be described.

At first, when the power is applied to heat a long fluorescent tube, the electric ovens(14) are operated by the controlled voltage applied through the transformers(6). At this time, the power is controlled by the transformers(6) so that the electric oven(14) is heated at the predetermined temperature which is appropriate to coil the fluorescent tube inserted in the oven(14). Then, a fluorescent tube is inserted into one of the electric ovens(14). And, by pressing the pressing part(15A) with the piston(9A) of the air cylinder(9) the electric oven(14) is opened, and a half of the electric oven(14) is lifted, then a fluorescent tube can be settled into the electric oven(14). After then, the electric oven(14) is closed by its weight and the air cylinder(17) is operated by the control of the control box(16) and the piston(-17A) with a ratchet(18) pushes the ratchet wheel(19) to rotate the lower turntable. By the rotation of the lower turn table(4), all of the connected parts, that is, the triangular plate(13), the upper turn table(3), the electric ovens(14), the attachments on the upper surface of the triangular plate(13), and all their attached parts are rotated.

The said regular motions are previously controlled by the control box(16), for instance, the rotating time is adjusted to 1~10 sec and once pressing of the air cylinder(17) makes ratchet wheel(19) rotate 120°.

When the ratchet wheel(19) is rotated 120° degrees, the electric oven(14) located at the position of the air cylinder(9) is rotated to the right, thereby it is located at the right side in FIG. 1. Then, the other electric oven(14) which is installed around the triangular plate(13) with the same interval of the angle of 120 degrees is again adjusted at the air cylinder(9) position in FIG. 1. And, the air cylinder(9) is again activated by means of the control box(16) and the piston(9A) pushes the pressing part(15A), and then the electric oven(14) is opened.

Again, another fluorescent tube is inserted into the electric oven(14), so that all the same operation is repeated. If the said inserting work of a fluorescent tube is done three times, one may continuously obtain from the electric oven(14) a heated fluorescent tube being suitable to be coiled.

Meanwhile, the upper plate(1), the air cylinder(9) attached to said upper plate(1), and the brush appartus(8) located downstream of said upper plate(1) are not rotated with the turn tables(3,4), the triangular plate(13), and electric ovens(14) but kept at their positions because a bearing(22) is installed with the shaft at the upper portion.

A fluorescent tube having been heated enough to be coiled is drawn from the electric oven(14) and brought manually to the screw(103A) of the tube coiling part(103). While air is blown into the opened end of the fluorescent tube by means of a air injector(200) the fluorescent tube is coiled manually around the screw(103A) groove. The reason of blowing air into the tube is to prevent the change of diameter of the tube such as shrivelling or deforming when the fluorescent tube is coiled around the screw(103A). After coiling the fluorescent tube around the screw(103A), the foot board(101) is pressed, so that the power of the motor(M) is applied to the tube coiling part(103) by means of the gear assembly(102) and the screw(103A) is rotated of the opposite direction to the coiling direction, thereby, the coiled tube can be easily drawn out.

Figure 5:
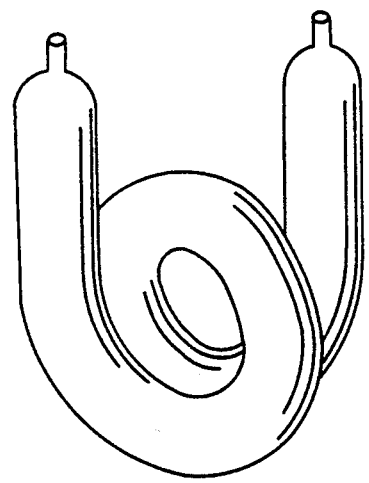
FIG. 5 is a perspective view of the coiled fluorescent tube according to the present invention.

FIG. 5 shows the coiled fluorescent tube(300) according to the above processing.

According to the present invention, the coiling procedure of the fluorescent tube can be easily made and the mass production can be achieved.

With more improvement, the automatization for the production can be expected.

Having described specific preferred embodiment of the present invention with reference to the accompanying drawings, it is to be understood that the invention is not limited to those precise embodiments, and that various changes and modifications may be effected therein by the skilled in the art without departing from the scope or the spirit of the invention as defined in the appended claims.

What is claimed is:

1. A fluorescent tube coiling apparatus comprising:
a rotatable turntable having a plurality of a tube-heating electric ovens mounted thereon, each said oven being openable for selectively placing a fluorescent tube therein and for removing heated fluorescent tubes therefrom, each said oven further comprising lever means for selectively opening the respective oven;

means for regulating inner temperature of the respective electric ovens;

a piston/cylinder assembly mounted adjacent said turntable, said piston/cylinder assembly being selectively operable to engage a respective one of said levers for opening the corresponding electric oven;

ratchet means for selectively rotating said turntable, such that the levers of the respective ovens are sequentially moved into a position for engagement by the piston/cylinder assembly;

control means for coordinating operation of said rachet means and said piston/cylinder assembly for actuating said piston cylinder assembly when said rachet menas aligns one said lever with said piston/cylinder assembly; and a tube coiling screw in proximity to said turntable for enabling a heated fluorescent tube to be coiled thereabout after sufficient heating by a selected one of said ovens.

2. A fluorescent tube coiling apparatus as in claim 1, further comprising means for rotating said tube coiling screw for facilitating coiling of one of said heated fluorescent tube thereabout.

3. A fluorescent tube coiling apparatus as set forth in claim 1, further comprising an air injector in proximity to said tube coiling screw for preventing shriveling of the heated fluorescent tube during coiling.

4. A fluorescent tube coiling apparatus as in claim 1, wherein the rotatable turntable comprises a rotatable shaft, upper and lower tables fixedly connected to said shaft in spaced apart substantially parallel relationship and a polygonal plate disposed intermediate said upper and lower tables and substantially parallel thereto, said ovens being mounted to said plate.

5. A fluorescent tube coiling apparatus as in claim 1, wherein said means for regulating inner temperatures of the respective electric ovens comprise a brush apparatus for applying a voltage to said electric ovens and transformers for regulating temperatures generated by said voltage.

6. A fluorescent tube coiling apparatus as in claim 1, wherein said turntable comprises a triangular plate with three sides, said plurality of ovens comprising three ovens spaced from one another by approximately 120° and aligned on the respective sides of said triangular plate.

* * * * *